(12) United States Patent
Kostrzewa (10) Patent No.: US 9,881,343 B2
(45) Date of Patent: Jan. 30, 2018

(54) SYSTEMS AND METHODS FOR PERFORMING UPDATES IN A DISTRIBUTED ENVIRONMENT

(71) Applicant: Thomson Reuters (Tax & Accounting) Inc., Carrollton, TX (US)

(72) Inventor: Kevin Patrick Kostrzewa, Kalamazoo, MI (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 271 days.

(21) Appl. No.: 14/529,230

(22) Filed: Oct. 31, 2014

(65) Prior Publication Data

US 2016/0127463 A1 May 5, 2016

(51) Int. Cl.
*G06F 15/16* (2006.01)
*G06Q 40/00* (2012.01)
*G06F 17/30* (2006.01)

(52) U.S. Cl.
CPC ....... *G06Q 40/10* (2013.01); *G06F 17/30345* (2013.01); *G06F 17/30557* (2013.01)

(58) Field of Classification Search
CPC ................................................. G06Q 40/10
USPC ................................ 709/203; 717/174–178
See application file for complete search history.

(56) References Cited

U.S. PATENT DOCUMENTS

| 6,035,423 | A | * | 3/2000 | Hodges | G06F 8/65 709/219 |
| 6,289,510 | B1 | * | 9/2001 | Nakajima | G06F 8/67 717/170 |
| 8,594,850 | B1 | * | 11/2013 | Gourlay | G05B 15/02 165/11.1 |
| 8,893,108 | B1 | * | 11/2014 | Pfeiffer | G06F 8/65 705/31 |
| 2009/0157731 | A1 | * | 6/2009 | Zigler | G06F 17/30749 |
| 2013/0042230 | A1 | * | 2/2013 | Little | G06F 8/65 717/173 |
| 2014/0173579 | A1 | * | 6/2014 | McDonald | G06F 8/65 717/170 |
| 2015/0248284 | A1 | * | 9/2015 | Poiesz | G06F 8/65 717/168 |
| 2015/0363185 | A1 | * | 12/2015 | Garratt | G06F 8/65 717/168 |

* cited by examiner

*Primary Examiner* — Duyen Doan (57) ABSTRACT

The present disclosure is directed towards systems and methods for performing updates in a distributed environment, which comprises receiving a platform product and a plurality of supporting products at a server, the server being accessible by one or more access devices and receiving a plurality of modified supporting products at the server, a given modified supporting product corresponding to a given supporting product. A determination is made as to whether a given one of the plurality of supporting products is in use by the one or more access devices. If the given one of the plurality of supporting products is not in use, the given one of the plurality of supporting products is overwritten with the corresponding modified supporting platform product. If the given one of the plurality of supporting products is in use, the given one of the plurality of supporting products is locked until its use terminates.

18 Claims, 7 Drawing Sheets

SYSTEMS AND METHODS FOR PERFORMING UPDATES IN A DISTRIBUTED ENVIRONMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2014 Thomson Reuters.

TECHNICAL FIELD

This disclosure relates generally to the updating data files in a distributed environment. More specifically, the disclosure is directed towards systems and methods for updating supporting data files in a distributed environment while allowing for current use of the application.

BACKGROUND

In the current computer systems landscape, corporate entities increasingly vie for ways to increase efficiency and decrease costs. One way corporate entities currently attempt to save costs is to utilize software applications that are executed in a distributed computing environment wherein the software platform executable and any supporting data files reside on a centralized server and are made accessible to multiple client devices. In this way, the corporate entity needs only to obtain control costs by effectively managing its software in one centralized location.

One drawback to such a configuration is that once an update is need to be installed to a specific portion of the platform product or any supporting data items, termination of use of the entirety of the system is necessary, preventing any users within the corporate entities to access and utilize the software application. Accordingly, there exists an need to create a system and methodology that allows for updates in a distributed environment without the necessity to terminate use of the entire system.

SUMMARY

The present disclosure is directed towards systems and methods for performing updates in a distributed environment. In one aspect, the computer-implemented method includes receiving a platform product and a plurality of supporting products at a server, the server being accessible by one or more access devices and receiving a plurality of modified supporting products at the server, a given modified supporting product corresponding to a given supporting product. A determination is then made as to whether a given one of the plurality of supporting products is in use by the one or more access devices. If the given one of the plurality of supporting products is not in use, the given one of the plurality of supporting products is overwritten with the corresponding modified supporting platform product.

According to one embodiment, if the given one of the plurality of supporting products is in use, the given one of the plurality of supporting products is locked until its use terminates, at which point the given one of the plurality of supporting products is unlocked. In one embodiment, the computer-implemented method further includes overwriting the given one of the plurality of supporting products when it is unlocked.

In one embodiment, the platform product includes a platform tax executable product and the plurality of supporting products includes one or more supporting tax data products used by the platform product. The one or more supporting tax data products, according to one embodiment, further includes one or more data items comprising at least one of federal tax rates, state tax rates, international tax rates, federal tax calculations, state tax calculations and international tax calculations.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
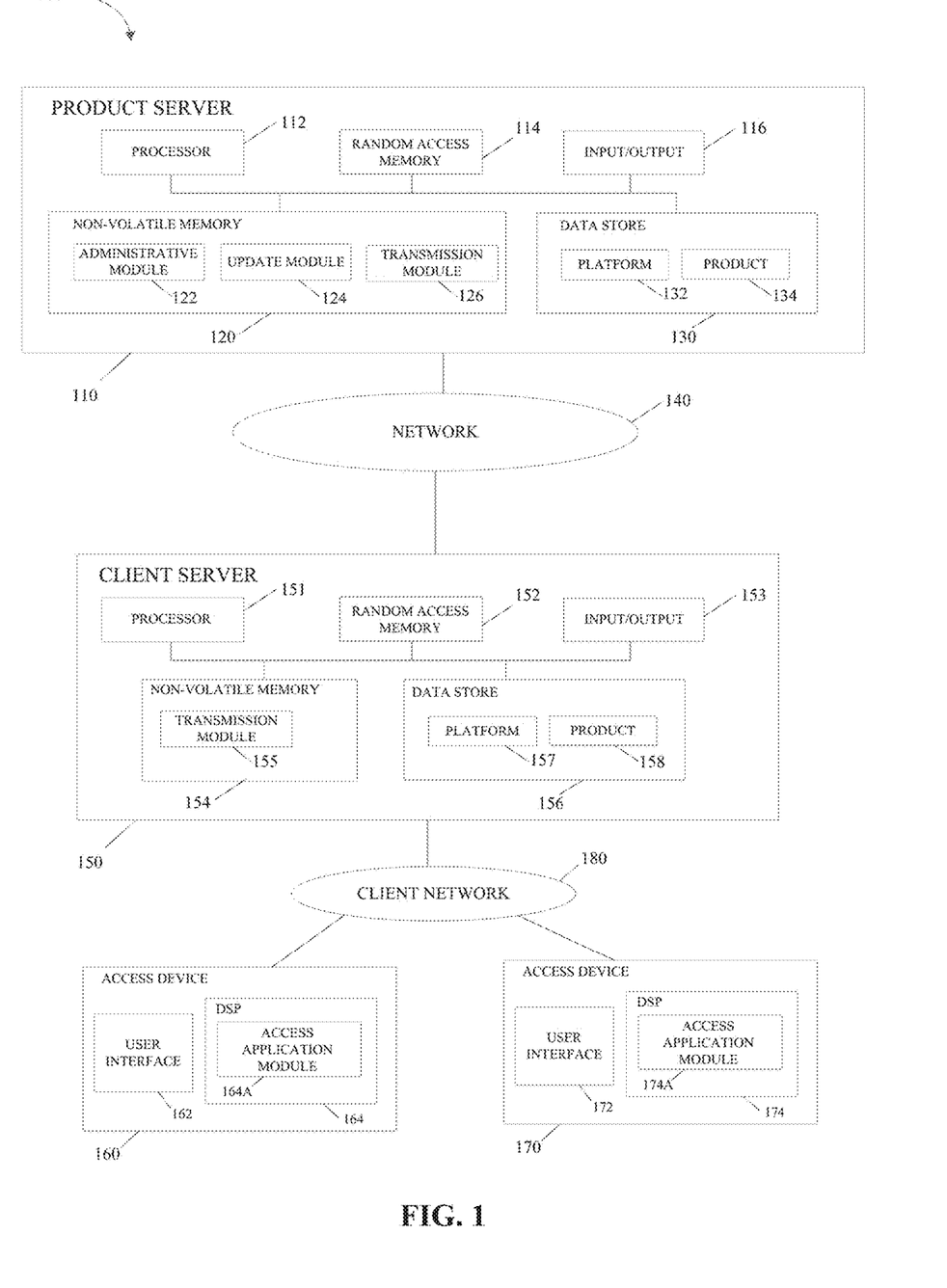
FIG. 1 is a schematic depicting an exemplary computer-based system for updating data files in a distributed environment.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instruction known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media.

In one embodiment, with reference to FIG. 1, the system 100 includes a product server 110 configured to include a processor 112, such as a central processing unit ("CPU"), random access memory ("RAM") 114, one or more input-output devices 116, such as a display device (not shown) and keyboard (not shown), non-volatile memory 120 and data store 130, all of which are interconnected via a common bus and controlled by the processor 112.

As shown in the FIG. 1 example, in one embodiment, the non-volatile memory 120 is configured to include an administrative module 122, an update module 124 and a transmission module 126. The administrative module 122 is configured to provide a platform data analysis product and supporting platform data products that is to be used in a distributed computing environment. The update module 124 is configured to effectuate the replacement of data files with updated data files, which according to one embodiment, includes replacing and updating supporting platform data products. According to one embodiment, a distributed computing environment comprises a centralized server at a client location, which stores and maintains data items and software applications that are accessible by and executed from multiple client access devices at the same time. In one embodiment, the distributed computing environment makes available on its centralized server, a software platform executable and supporting platform data products, which are used in the execution of the platform executable. For example, Thomson Reuters™ offers a suite of tax preparation products known in the industry as UltraTax CS®, which includes the platform executable product and over three hundred supporting data products directed to the applicable tax rates, calculations and statutory considerations for each applicable jurisdiction.

Returning to FIG. 1, the transmission module 126 is configured to transmit and present data files maintained in a data store 130 to a client server 150. Additional details of modules 122, 124 and 126 are discussed in connection with FIGS. 2-8.

The data store 130 of the product server 110 is a repository that maintains and stores information utilized by the before-mentioned modules 122, 124 and 126. In one embodiment, the data store 130 is a relational database. In another embodiment, the data store 130 is a directory server, such as a Lightweight Directory Access Protocol ("LDAP").

In yet another embodiment, the data store 130 is an area of non-volatile memory 120 of the product server device 110.

In one embodiment, as shown in the FIG. 1 example, the data store 130 includes a platform database 132 and a product database 134. The platform database 132 is configured to maintain a platform executable, including all necessary data files. The product database 134 is operative to store supporting data products used in the execution of the platform executable. As set forth in the previous example, Thomson Reuters™ UltraTax CS® includes a platform executable product, which, according to one embodiment, is stored in the platform database 132, and over three hundred supporting data products directed to the applicable tax rates, calculations and statutory considerations for each applicable jurisdiction, which, according to one embodiment, is stored in the product database 134.

Although the data store 130 shown in FIG. 1 is connected to the network 170, it will be appreciated by one skilled in the art that the data store 130 and/or any of the information shown therein, can be distributed across various servers and be accessible to the client server 150 and/or the product server 110 over the network 170, be coupled directly to the client server 150 and/or the product server 110, or be configured in an area of non-volatile memory 120 of the product server 110.

In one embodiment, the system 100 further includes the client server 150 configured to include a processor 152, such as a central processing unit ("CPU"), random access memory ("RAM") 154, one or more input-output devices 156, such as a display device (not shown) and keyboard (not shown), non-volatile memory 154 and data store 156, all of which are interconnected via a common bus and controlled by the processor 151.

As shown in the FIG. 1 example, in one embodiment, the non-volatile memory 154 is configured to include a transmission module 155, which is configured to transmit to and receive data files from the product server 110 and to store data files received from the product server 110 in a data store 156. Additional details of transmission module 155 are discussed in connection with FIGS. 2-8.

The data store 156 of the client server 150 is a repository that maintains and stores information utilized by the before-mentioned module 154. In one embodiment, the data store 156 is a relational database. In another embodiment, the data store 156 is a directory server, such as a Lightweight Directory Access Protocol ("LDAP"). In yet another embodiment, the data store 156 is an area of non-volatile memory 154 of the client server 150.

In one embodiment, the data store 156, according to one embodiment, comprises a platform data store 157 and a product data store 158. The platform database 157 is configured to maintain a platform executable, including all necessary data files, received from the product server 110. The product database 158 is operative to store supporting data products used in the execution of the platform executable received from the product server 110. According to one embodiment, the platform data store 157 and the product data store 158 each maintain a mirror of the files maintained in the platform data store 132 and the product data store 134, respectively. As set forth in the previous example, Thomson Reuters™ UltraTax CS® includes a platform executable product, which, according to one embodiment, is received from the product server 110 and stored in the platform database 157, and over three hundred supporting data products directed to the applicable tax rates, calculations and statutory considerations for each applicable jurisdiction, which, according to one embodiment, is received from the product server 110 and stored in the product database 158.

Although the data store 150 shown in FIG. 1 is connected to the network 170, it will be appreciated by one skilled in the art that the data store 156 and/or any of the information shown therein, can be distributed across various servers and be accessible to the client server 150 and/or the product server 110 over the network 170, be coupled directly to the client server 150 and/or the product server 110, or be configured in an area of non-volatile memory 154 of the client server 150.

As shown in FIG. 1, in one embodiment, a network 150 is provided that can include various devices such as routers, server, and switching elements connected in an Intranet, Extranet or Internet configuration. In one embodiment, the network 150 uses wired communications to transfer information between the product server 110 and the client server 150. In another embodiment, the network 150 employs wireless communication protocols to transfer information between the product server 110, the data store 130, the client server 150 and the data store 156. For example, the network 150 may be a Wide Area Network (WAN), such as the Internet, which employs one or more transmission protocols, e.g. TCP/IP. The network 150 may also be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In another embodiment, the network 150 may employ a combination of digital cellular standards and wireless transmission protocols. In yet other embodiments, the network 150 may employ a combination of wired and wireless technologies to transfer information between the product server 110, the data store 130, the client server 150 and the data store 156. In yet another embodiment, the network 150 employs a combination of wired and wireless technologies to transfer information between the access devices 160 and 170, the product server device 110 and the client server 150. In another embodiment, the network 150 employs wireless communication protocols to transfer information between the access devices 160 and 170, the product server 110 and the client server 150.

The access devices 160 and 170, according to one embodiment, are general purpose or special purpose computing devices comprising: a graphical user interface ("GUI"), GUI 162 and GUI 172, respectively; a digital signal processor ("DSP"), DSP 164 and DSP 174, respectively; each DSP having an access application module that allows a user to access the client server 150, access application module 164A and access application module 174A, respectively; transient and persistent storage devices (not shown); an input/output subsystem (not shown); and a bus to provide a communications path between components comprising the general purpose or special purpose computer (not shown).

According to one embodiment, access application module 164A and access application module 174A use thin client applications (not shown) to access the client server 150. According to another embodiment, access application module 164A and access application module 174A are web-based and use thin client applications (not shown), such as a web browser, which allows a user to access the product server 110 and/or the client server 150. Examples of web browsers are known in the art, and include well-known web browsers such as such as Microsoft® Internet Explorer®, Google Chrome™, Mozilla Firefox® and Apple® Safari®. Although system 100 is described generally herein as comprising two separate access devices, access devices 160 and 170, it should be appreciated that the present invention does not require at least two separate access devices, nor is it limited to solely two access devices. Indeed, system 100 can include a single access device, such as access device 160 or access device 170, or multiple access devices.

As shown in FIG. 1, in one embodiment, a network 180 is provided that can include various devices such as routers, server, and switching elements connected in an Intranet, Extranet or Internet configuration. In one embodiment, the network 180 uses wired communications to transfer information between the client server 150 and the access devices 160 and 170. In another embodiment, the network 180 employs wireless communication protocols to transfer information between the access devices 150 and 160, the data store 156 and the client device 150. For example, the network 180 may be a Local Area Network (LAN), such as company network or Intranet, which employs one or more transmission protocols, e.g. TCP/IP. The network 180 may also be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). As another example, the network 180 may employ a combination of digital cellular standards and wireless transmission protocols. In yet other embodiments, the network 180 may employ a combination of wired and wireless technologies to transfer information between the access devices 150 and 160, the client server 110 and the data store 156. In yet another embodiment, where the network 150 employs a combination of wired and/or wireless technologies to transfer information between the access devices 160 and 170, the product server device 110 and the client server 150, network 180 may not be used or may be used for limited transmission purposes.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
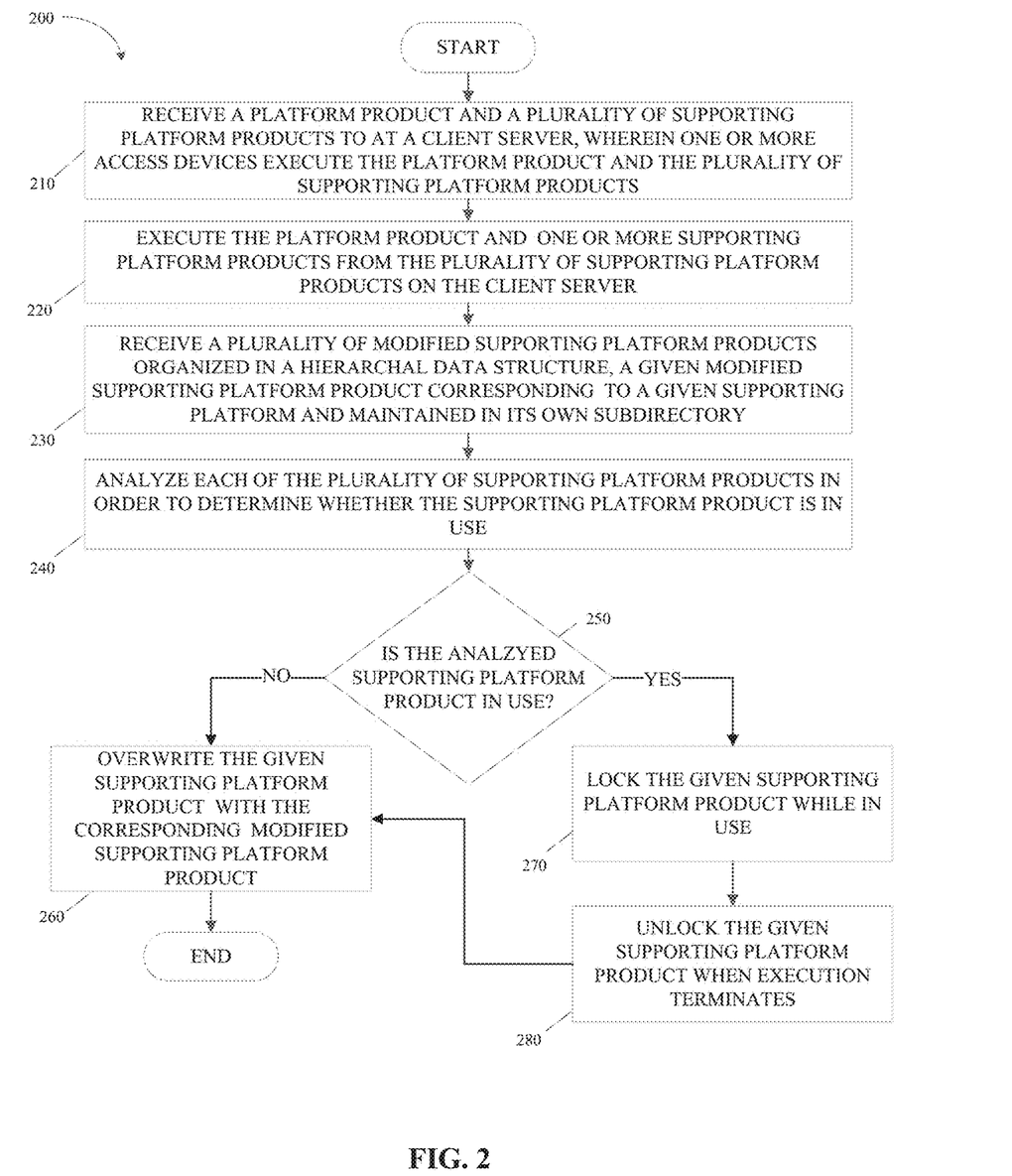
FIG. 2 is a flow diagram illustrating an exemplary computer-implemented method for updating data files in a distributed environment.

Turning now to FIG. 2, an exemplary method 200 for updating data files in a distributed environment is disclosed in the context of system 100 of FIG. 1. In the illustrated embodiment shown in FIG. 2, a platform product and a plurality of supporting platform products are transmitted from the product server 110 to the client server 150, wherein the access device 160 or the access device 170 can access the client server 150 and execute the platform product and the plurality of supporting platform products, step 210. According to one embodiment, the transmission module 126 of the product server 110 transmits the platform product maintained in the platform database 132 and a plurality of supporting platform products maintained in the product database 134 to the transmission module 155 of the client server 150. For example, as presented discussed, Thomson Reuters™ offers a suite of tax preparation products in a distributed computing environment, known in the industry as UltraTax CS®, which includes the platform executable product, maintained in the platform database 132 and transmitted to client server 150 over the network 140, where it is then received by the transmission module 155 and stored in the platform data store 157.

Figure 3:
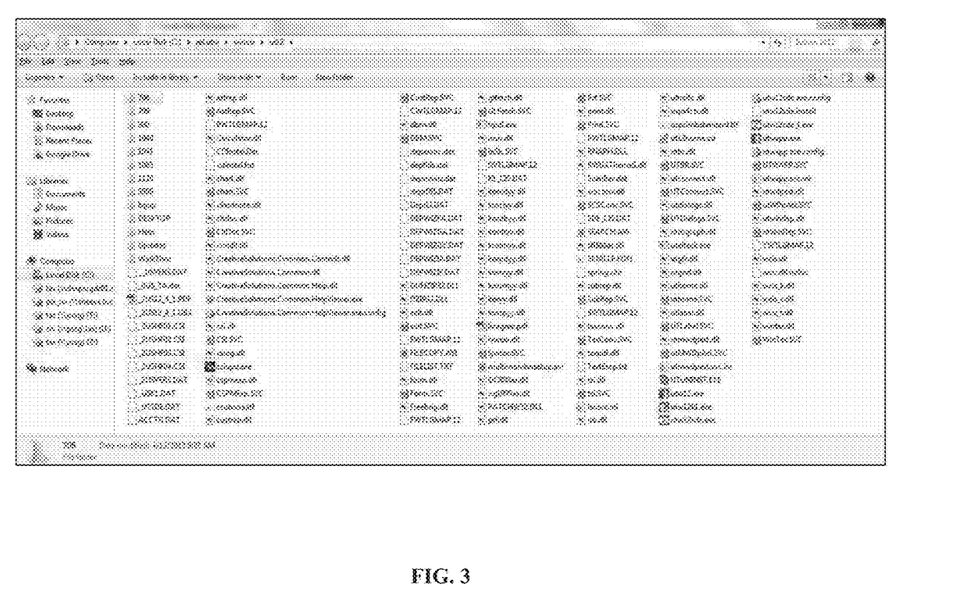
FIG. 3 is a screen diagram of an exemplary hierarchal data structure used in updating data files in a distributed environment.
Figure 4:
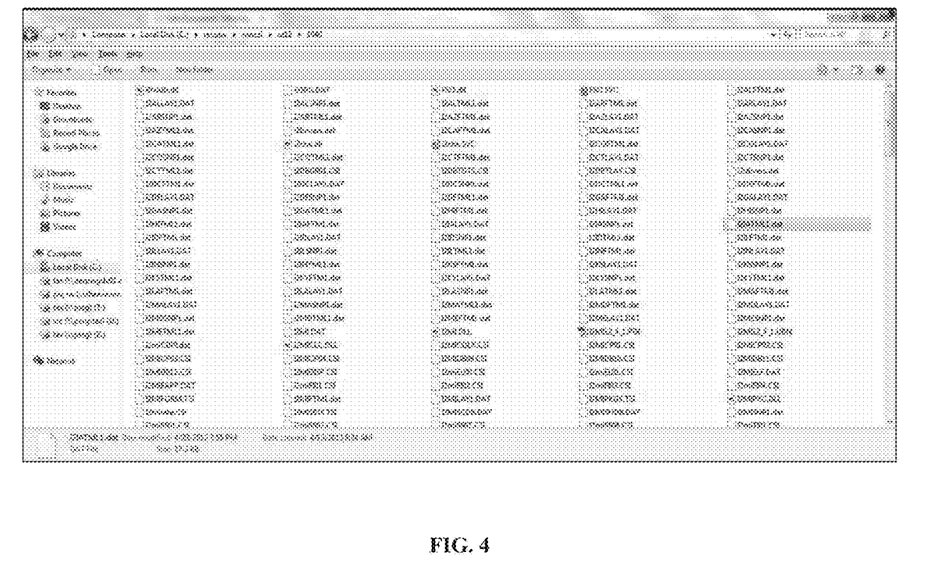
FIG. 4 is a screen diagram of an exemplary hierarchal data structure used in updating data files in a distributed environment.

Prior to the present invention, a platform product and it supporting platform products in a distributed computing environment would be transmitted in a data file wherein the its directory structure would include the platform product and all supporting products in a single sub-directory according to product type. For example, referring to FIGS. 3 and 4, the 2012 version UltraTax CS® included a directory structure wherein the platform product, which included the main executable, a tax calculation engine, a forms graphic engine and the ability to interact with the supporting products, was maintained in the top level folder at "\wincsi\ut12." The directory structure of the 2012 version UltraTax CS® also included a set of federal and state supporting were maintained in the subdirectory "\wincsi\ut12\1040", in which each supporting tax product includes calculation logic in a .dll file, electronic filing capability in a .dll file and metadata to describe the various forms and input screens in the .csi and .dat files. Prior to the present invention, all of the federal, state and local supporting tax products maintained in a single subdirectory for each product type. For example, all 1040 tax products, which include all 1040 tax rates and calculations for federal, states and local jurisdictions, were maintained in the subdirectory "\wincsi\ut12\1040" and 1120 tax products, which included all 1120 tax rates and calculations for federal, states and local jurisdictions, were maintained in the subdirectory "\wincsi\ut12\1120." The drawback to this directory structure is that because a distributed computing environment includes multiple users at access devices, such as access devices 160 and 170, accessing the platform product and various supporting products, any updates to an individual supporting product requires termination of use of the entirety of the supporting products and of the platform product.

Figure 5:
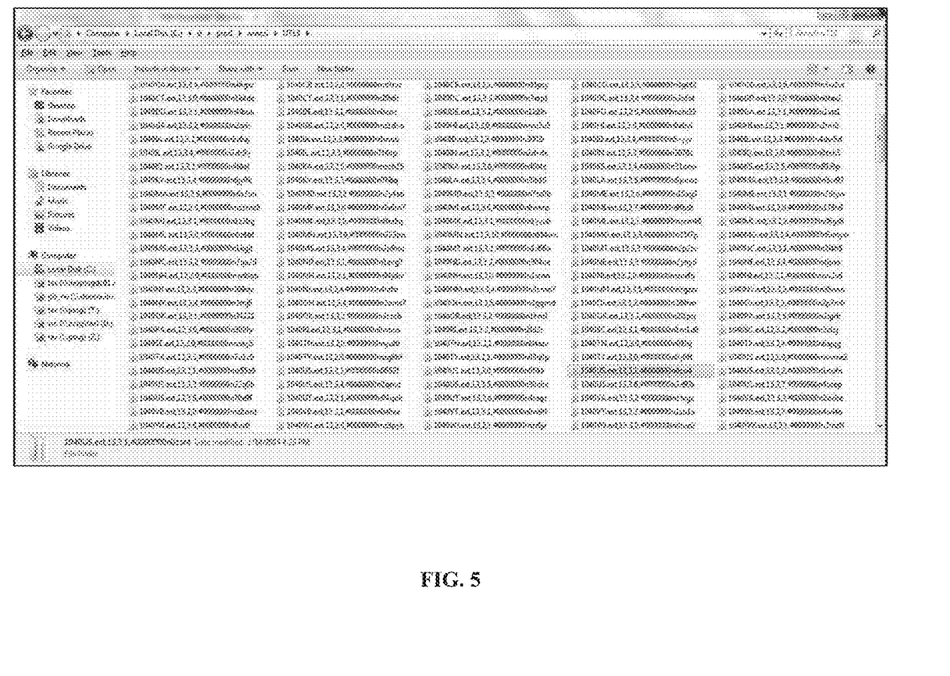
FIG. 5 is a screen diagram of an exemplary hierarchal data structure used in updating data files in a distributed environment.

The present invention circumvents such restrictions and allows for individual updates without the necessity of ceasing termination of the platform product or of any of the supporting products. According to one embodiment, each of the supporting products is deployed in such a fashion that each individual supporting product is maintained in a dedicated versioned directory. FIG. 5 illustrates the deployment in which each versioned 1040 tax product for each jurisdiction is maintained in its own subdirectory. For example, "ut13\1040CAext,13,3,3,4" is the subdirectory for the "1040CA" tax product for the California, externally released, version 13.3.4

Returning to FIG. 2, at step 220, the access device 160 or the access device 170 executes the platform product and one or more supporting platform products from the plurality of supporting platform products stored in the platform data store 157 and the product data store 158, respectively. According to one embodiment, each of the supporting platform products are maintained in its own individual subdirectory as illustrated in FIG. 5. Returning again to FIG. 2, a plurality of modified tax products organized in a hierarchal data structure is transmitted from the product server 110 to the client server 150, step 230. According to one embodiment, a given modified supporting platform product corresponds to a given supporting platform product and is maintained in its own subdirectory. For example, a federal 1040 tax product is maintained in the product database 158 in a directory named "1040US, ext13,3,1." Subsequently, the transmission module 155 receives an updated federal 1040 tax product in a directory named "1040US, ext13,3,6" and stores it in the product database 158.

Figure 6:
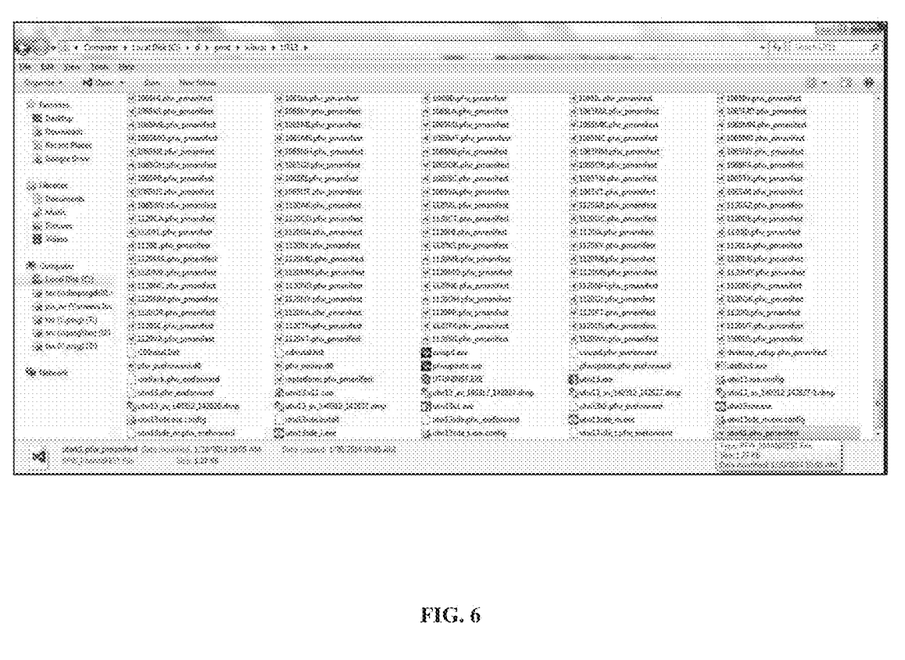
FIG. 6 is a screen diagram of an exemplary hierarchal data structure used in updating data files in a distributed environment.
Figure 7:
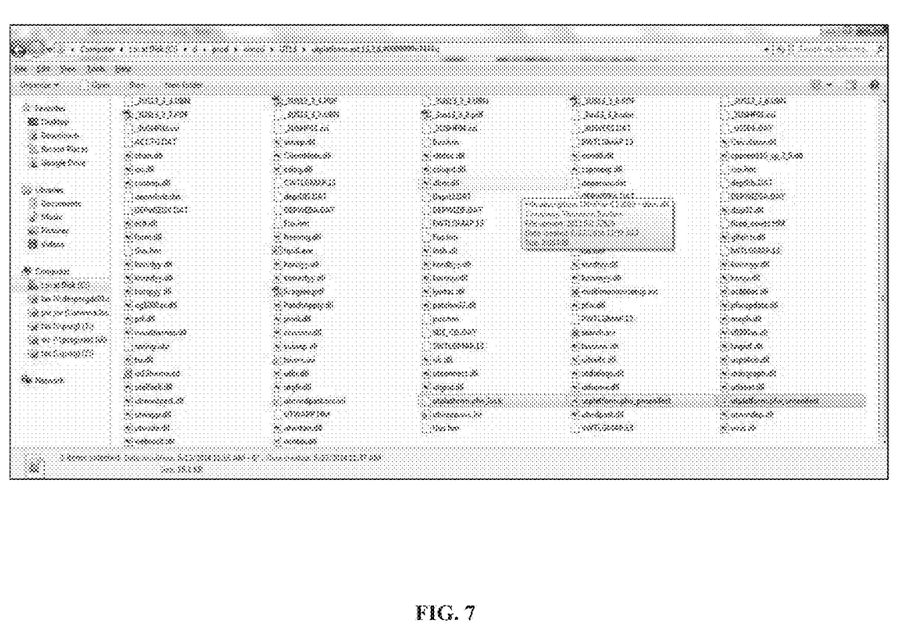
FIG. 7 is a screen diagram of an exemplary hierarchal data structure used in updating data files in a distributed environment.

At step 240 of FIG. 2, each supporting platform product of the plurality of supporting platform products is analyzed in order to determine whether the supporting platform product is in use. According to one embodiment, in addition to the platform product and the supporting platform products is a library of core binaries that determine and launch the proper version of each product. FIGS. 6 and 7 illustrate an exemplary deployment of the library of core binaries, according to one embodiment, which comprises a plurality of ".pfw" files for each individual tax product. One type of "pfw" includes a ".pfw_lock" file, whose function, according to one embodiment, is used to determine the whether the analyzed supporting platform product is in use, step 250. In one embodiment, a determination as to whether a given supporting product is in use includes not a only a determination as to whether the individual supporting product itself is being executed, but also as to whether any other supporting tax product that depend on the analyzed supporting platform product is in use.

If the analyzed supporting platform product is not in use, a ".pfw_pmanifest" file, which contains instructions to the processor 151 overwrite the given supporting platform product maintained in the product data store 158 with the corresponding modified supporting platform product, is utilized in response to the ".pfw_lock" having made a determination that the file is not in use, step 260. For example, if the ".pfw_lock" file is used to determine that a given supporting tax product is not is use by the access devices 160 or 170, then the ".pfw_pmanifest" file is utilized in overwriting the given supporting tax product in the product data store 158 with the updated version of that tax product.

If the analyzed supporting platform product is in use, then the given supporting platform product is locked for the duration of the time that it is in use, step 270. According to one embodiment, as illustrated in FIG. 7, the ".pfw_lock" file, which also provides instructions to the processor 151 to lock an individual product subdirectory if a determination is made that the individual supporting platform product is in use. At step 280, once use of the given supporting platform product terminates, then process flow continues to step 260, in which the given supporting platform product is overwritten with the corresponding modified supporting platform product.

FIGS. 1 through 8 are conceptual illustrations allowing for an explanation of the present disclosure. It should be understood that various aspects of the embodiments of the present disclosure may be implemented in hardware, firmware, software, or combinations thereof. In such embodiments, the various components and/or steps may be implemented in hardware, firmware, and/or software to perform the functions of the present disclosure. That is, the same piece of hardware, firmware, or module of software may perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method comprising:
   transmitting from a product server a platform product and a plurality of supporting products, wherein each of the supporting products is maintained in a supporting product subdirectory;
   receiving the platform product and the plurality of supporting products at a client server, the client server being accessible by one or more access devices;
   establishing a usage condition in a lock file of the corresponding supporting product subdirectory, the lock file indicative of usage by one or more of a plurality of access devices;
   transmitting from a product server a plurality of modified supporting products irrespective of the usage condition of the corresponding lock file;
   receiving automatically the plurality of modified supporting products at the client server, a given modified supporting product corresponding to a given supporting product;
   determining whether a given one of the plurality of supporting products is in use by the one or more access devices, based in part on the lock file of the corresponding supporting product subdirectory, the lock file indicative of access device usage; and
   if the given one of the plurality of supporting products is not in use, overwrite the given one of the plurality of supporting products with the corresponding modified supporting product at the client server.

2. The computer-implemented method of claim 1, further comprising:
   if the given one of the plurality of supporting products is in use, locking the product subdirectory of the given one of the plurality of supporting products; and
   unlocking the given one of the plurality of supporting products when its use terminates.

3. The computer-implemented method of claim 2, further comprising overwriting the given one of the plurality of supporting products when it is unlocked.

4. The computer-implemented method of claim 1, wherein the platform product comprises a platform tax executable product.

5. The computer-implemented method of claim 1, wherein the plurality of supporting products comprises one or more supporting tax data products used by the platform product.

6. The computer-implemented method of claim 5, wherein one or more supporting tax data products comprises one or more data items comprising at least one of federal tax rates, state tax rates, international tax rates, federal tax calculations, state tax calculations and international tax calculations.

7. Non-transitory computer readable media comprising program code stored thereon for execution by a programmable processor to perform a method for performing updates in a distributed environment, the non-transitory computer readable media comprising:
   program code for transmitting from a product server a platform product and a plurality of supporting products, wherein each of the supporting products is maintained in a supporting product subdirectory;

program code for receiving the platform product and the plurality of supporting products at a client server, the client server being accessible by one or more access devices;

program code for establishing a usage condition in a lock file of the corresponding supporting product subdirectory, the lock file indicative of usage by an access device;

program code for transmitting from a product server a plurality of modified supporting products irrespective of the usage condition of the corresponding lock file;

program code for receiving automatically the plurality of modified supporting products at the client server, a given modified supporting product corresponding to a given supporting product;

program code for determining whether a given one of the plurality of supporting products is in use by the one or more access devices, based in part on the lock file of the corresponding supporting product subdirectory, the lock file indicative of access device usage; and if the given one of the plurality of supporting products is not in use, program code for overwrite the given one of the plurality of supporting products with the corresponding modified supporting product at the client server.

8. The non-transitory computer readable media of claim 7, further comprising:

if the given one of the plurality of supporting products is in use, program code for locking the product subdirectory of the given one of the plurality of supporting products; and program code for unlocking the given one of the plurality of supporting products when its use terminates.

9. The non-transitory computer readable media of claim 8, further comprising program code for overwriting the given one of the plurality of supporting products when it is unlocked.

10. The non-transitory computer readable media of claim 7, wherein the platform product comprises a platform tax executable product.

11. The non-transitory computer readable media of claim 7, wherein the plurality of supporting products comprise one or more supporting tax data products used by the platform product.

12. The non-transitory computer readable media of claim 11, wherein one or more supporting tax data products comprises one or more data items comprising at least one of federal tax rates, state tax rates, international tax rates, federal tax calculations, state tax calculations and international tax calculations.

13. A system for multivariate testing, the system comprising:

a product server configured to:

transmit a platform product and a plurality of supporting products, wherein each of the supporting products is maintained in a supporting product subdirectory; and transmit a plurality of modified supporting products;

a client server configured to:

receive automatically the platform product and the plurality of supporting products at the client server, the client server being accessible by one or more access device, wherein each of the supporting products is maintained in a supporting product subdirectory;

establishing a usage condition in a lock file of the corresponding supporting product subdirectory, the lock file indicative of usage by one or more of a plurality of access devices;

receive the plurality of modified supporting products at the client server irrespective of the usage condition of the corresponding lock file, a given modified supporting product corresponding to a given supporting product;

wherein the client server includes a processor and a memory, the memory storing instructions that, in response to receiving request on the one or more access devices, cause the processor to:

determine whether a given one of the plurality of supporting products is in use by the one or more access devices, based in part on the lock file of the corresponding supporting product subdirectory, the lock file indicative of access device usage; and if the given one of the plurality of supporting products is not in use, overwrite the given one of the plurality of supporting products with the corresponding modified supporting product at the client server.

14. The system of claim 13, wherein:

if the given one of the plurality of supporting products is in use, the processor further locks the product subdirectory of the given one of the plurality of supporting products; and unlocks the given one of the plurality of supporting products when its use terminates.

15. The system of claim 14, wherein the processor further overwrites the given one of the plurality of supporting products when it is unlocked.

16. The system of claim 13, wherein the platform product comprises a platform tax executable product.

17. The system of claim 13, wherein the plurality of supporting products comprises one or more supporting tax data products used by the platform product.

18. The system of claim 13, wherein one or more supporting tax data products comprises one or more data items comprising at least one of federal tax rates, state tax rates, international tax rates, federal tax calculations, state tax calculations and international tax calculations.

* * * * *